US011893933B2

(12) United States Patent
Chang et al.

(10) Patent No.: US 11,893,933 B2
(45) Date of Patent: Feb. 6, 2024

(54) DISPLAY BURN-IN COMPENSATION

(71) Applicant: Google LLC, Mountain View, CA (US)

(72) Inventors: Sun-il Chang, San Jose, CA (US); Hyunchul Kim, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/967,222

(22) PCT Filed: Jan. 24, 2020

(86) PCT No.: PCT/US2020/015072
§ 371 (c)(1),
(2) Date: Aug. 4, 2020

(87) PCT Pub. No.: WO2021/150249
PCT Pub. Date: Jul. 29, 2021

(65) Prior Publication Data
US 2022/0366846 A1 Nov. 17, 2022

(51) Int. Cl.
*G09G 3/3233* (2016.01)

(52) U.S. Cl.
CPC ... *G09G 3/3233* (2013.01); *G09G 2320/0295* (2013.01); *G09G 2320/045* (2013.01);
(Continued)

(58) Field of Classification Search
CPC ......... G09G 3/3233; G09G 2320/0295; G09G 2320/045; G09G 2320/046; G09G 2330/10; G09G 2360/147; G09G 2360/16
See application file for complete search history.

(56) References Cited

U.S. PATENT DOCUMENTS

2009/0243498 A1* 10/2009 Childs .................. G09G 3/3233 315/169.3
2010/0201275 A1 8/2010 Cok et al.
(Continued)

FOREIGN PATENT DOCUMENTS

WO WO 2005/015530 2/2005

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*
(Continued)

*Primary Examiner* — Jeff Piziali
(74) *Attorney, Agent, or Firm* — Fish & Richardson P.C.

(57) ABSTRACT

Methods, systems, and apparatus, including computer programs encoded on computer storage media, for compensating an image to be shown on a display including an array of light-emitting pixels and a sensor arranged to receive light transmitted by adjacent light-emitting pixels. A method includes collecting, from the sensor, a luminance of light received by the sensor during an emission-on period, and a luminance of light received by the sensor during an emission-off period. The method includes calculating, by comparing the luminance during the emission-on period to the luminance during the emission-off period, a luminance of light internally reflected from the adjacent pixels and received by the sensor during the emission-on period. The method includes determining that an error between the luminance of light internally reflected and a reference luminance equals or exceeds a threshold error, and adjusting a driving voltage for driving the pixels to reduce the error.

15 Claims, 6 Drawing Sheets

(52) U.S. Cl.
CPC ... *G09G 2320/046* (2013.01); *G09G 2330/10* (2013.01); *G09G 2360/147* (2013.01); *G09G 2360/16* (2013.01)

(56) References Cited

U.S. PATENT DOCUMENTS

| | | | | |
|---|---|---|---|---|
| 2010/0230610 | A1* | 9/2010 | Van Der Zaag | G01N 21/6454 250/200 |
| 2012/0212730 | A1* | 8/2012 | White | G09G 3/3406 356/229 |
| 2013/0278147 | A1 | 10/2013 | Vetsuypens et al. | |
| 2016/0042676 | A1* | 2/2016 | Berkeley | G09G 3/006 345/589 |
| 2021/0327364 | A1* | 10/2021 | Kelly | H04M 1/72454 |

OTHER PUBLICATIONS

PCT International Search Report and Written Opinion in International Appln No. PCT/US2020/015072, dated Jun. 8, 2020, 16 pages.
International Preliminary Report on Patentability in International Appln. No. PCT/US2020/015072, dated Aug. 4, 2022, 11 pages.

* cited by examiner

DISPLAY BURN-IN COMPENSATION

CROSS-REFERENCE TO RELATED APPLICATION

This application is a National Stage Application under 35 U.S.C. § 371 and claims the benefit of International Application No. PCT/US2020/015072, filed Jan. 24, 2020. The disclosure of the foregoing application is hereby incorporated by reference in its entirety.

TECHNICAL FIELD

This specification relates generally to flat panel displays and compensating for burn-in in flat panel displays.

BACKGROUND

Electronic devices include flat panel displays on which visual images may be shown. For example, a user of a computing device may view visual images on a flat panel display while watching a video or playing a video game. Display quality of flat panel displays can degrade over time.

SUMMARY

Techniques are described for display burn-in compensation.

In flat panel display systems, such as organic light-emitting diode (OLED) displays, OLED material efficiency can degrade over time. Display degradation can be accelerated due to high current densities (e.g., high luminance), and ambient conditions such as high temperatures.

Display degradation can result in decreasing pixel brightness over time. For example, at a given driving voltage, an OLED of a pixel or sub-pixel may become dimmer over a period of days, weeks, and months. Pixel degradation over time can be referred to as "burn-in."

In order to extend OLED lifetime, luminance degradation can be estimated using statistical burn-in information. A display system can apply compensation based on a burn-in behavior model. Compensation can include raising the driving voltage over time in order to maintain consistent pixel brightness and color as the OLEDs degrade.

In some cases, actual display burn-in may not follow the burn-in model exactly. The display pixels may degrade at a faster or slower rate than the burn-in model. Thus, the compensation may raise the driving voltage to a value that is too high, or to a value that is not high enough, to maintain consistent brightness and color.

A display system can include sensors underneath the display. The sensors can include, for example, ambient light sensors (ALS) and red-green-blue (RGB) color sensors. The ALS and/or RGB sensors can receive and measure ambient light and color to adapt display brightness and color.

The ALS and/or RGB sensors under a display can also receive internally reflected OLED light. The sensors can measure a luminance of received light during both emission-on periods and emission-off periods. The display system can then compare the measured light from the sensors during the emission-on time to measured light from the sensors during the emission-off time to calculate a luminance of the internally reflected light.

The display system can compare the luminance of the internally reflected light to a reference luminance that is based on the burn-in model. Based on the difference between the reflected light luminance and the reference luminance, the display system can estimate the error of current burn-in compensation model. The display system can then update the burn-in model based on the estimated error. For example, the display system can apply a correction factor to the burn-in model that reduces the error to zero, or near zero.

The techniques described can improve flat-panel display quality. For example, the techniques described can maintain consistent brightness and color of the display. The techniques described can also extend OLED lifetime.

In general, one innovative aspect of the subject matter described in this specification can be embodied in methods for compensating an image to be shown on a display including an array of light-emitting pixels, with a sensor being arranged to receive light transmitted by adjacent light-emitting pixels of the display. A method includes collecting, from the sensor, a luminance of light received by the sensor during an emission-on period during which the adjacent light-emitting pixels emit light; collecting, from the sensor, a luminance of light received by the sensor during an emission-off period during which the adjacent light-emitting pixels emit no light; calculating, by comparing the luminance of the light received during the emission-on period to the luminance of the light received during the emission-off period, a luminance of light internally reflected from the adjacent light-emitting pixels and received by the sensor during the emission-on period; determining that an error between the luminance of light internally reflected from the adjacent light-emitting pixels and a reference luminance equals or exceeds a threshold error; and adjusting a driving voltage for driving the light-emitting pixels to reduce the error.

The foregoing and other embodiments can each optionally include one or more of the following features, alone or in combination. In some implementations, the array of light-emitting pixels includes an array of OLEDs.

In some implementations, the driving voltage drives the light-emitting pixels based on a burn-in model.

In some implementations, adjusting the driving voltage to reduce the error includes adjusting the burn-in model by a correction factor.

In some implementations, the correction factor includes an additive inverse of the error.

In some implementations, the sensor is one of an ambient light sensor or an RGB sensor.

In some implementations, the reference luminance includes an expected luminance of light internally reflected from the adjacent light-emitting pixels and received by the sensor.

In some implementations, determining that an error between the luminance of light internally reflected from the adjacent light-emitting pixels and the reference luminance equals or exceeds a threshold error includes accumulating the error over a period of time; averaging the error; and comparing the averaged error to the threshold error.

In some implementations, adjusting the driving voltage includes adjusting the driving voltage for all pixels of the array.

In some implementations, adjusting the driving voltage includes adjusting the driving voltage for a selection of pixels of the array.

Implementations of the above techniques include methods, apparatus, systems and computer program products. One such computer program product is suitably embodied in a non-transitory machine-readable medium that stores instructions executable by one or more processors. The instructions are configured to cause the one or more processors to perform the above-described actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1B:
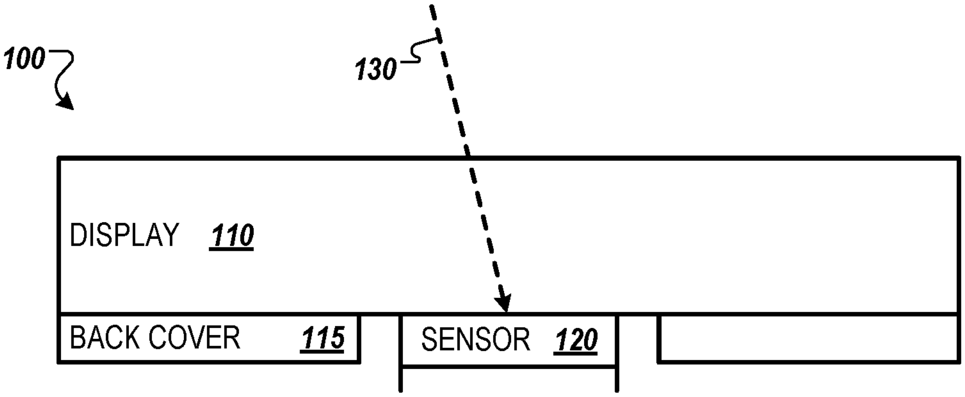
FIGS. 1A and 1B are diagrams of an example electronic device with a display and a light sensor.
Figure 1A:
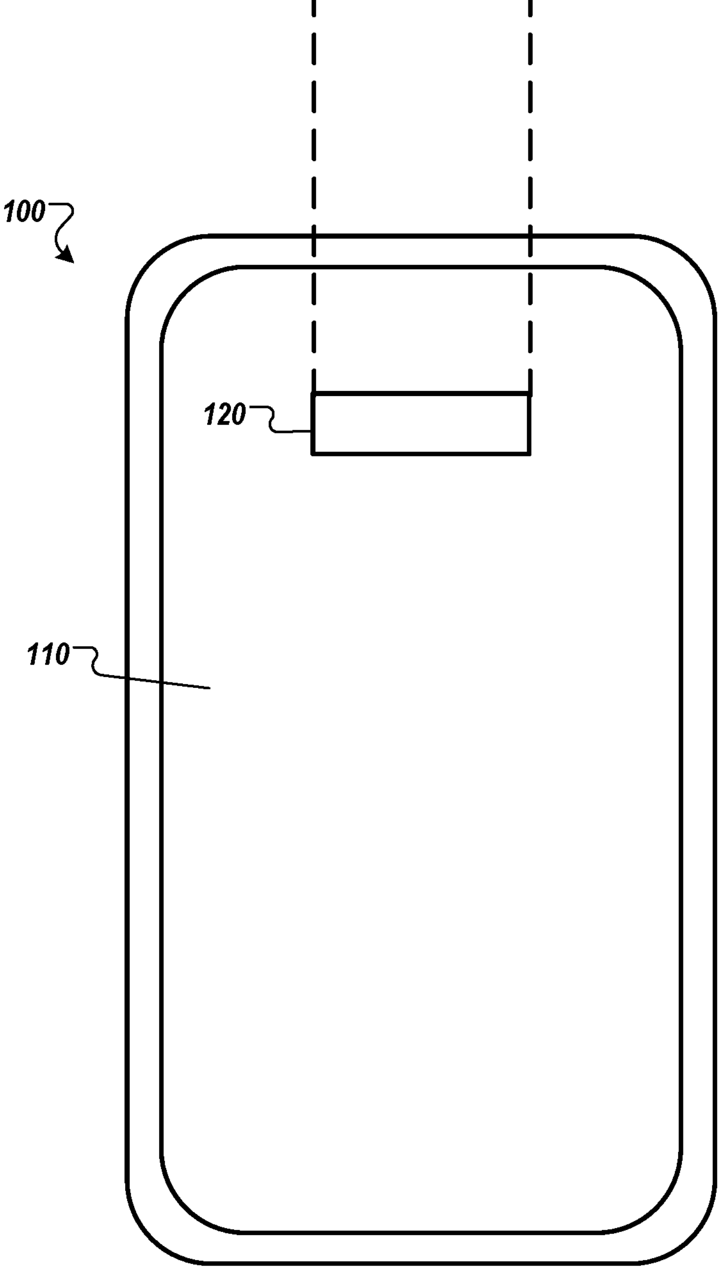

FIGS. 1A and 1B are diagrams of an example electronic device 100 with a display 110 and a light sensor 120. FIG. 1A illustrates a front perspective view of the electronic device 100. FIG. 1B illustrates an example cross section view of the electronic device 100.

Referring to FIG. 1A, the electronic device 100 may be, for example, a smart phone, a television, a smart watch, or a handheld game console. The display 110 includes an array of light-emitting pixels. In operation, the display 110 can display an image by illuminating the light-emitting pixels. The display 110 may be, for example, an active matrix organic light-emitting diode (OLED), or a light-emitting diode (LED) liquid crystal display (LCD). The electronic device 100 includes the light sensor 120 adjacent to the display 110. For example, the light sensor 120 may be located behind the display 110 from the front perspective view of the electronic device 100.

An OLED display generally includes an array of pixels, each pixel including one or more OLEDs. An OLED display is typically driven by driver circuits including a row driver and a column driver. The row driver, e.g., a scan driver, sequentially selects each row of pixels in the display, and the column driver, e.g., a data driver, provides a driving voltage to pixel circuits in the selected row. The pixel circuits generate electric current that corresponds to the driving voltage. The pixel circuits provide the current to OLEDs of the pixel, enabling the selected OLEDs to emit light, and presenting an image on the display. Signal lines such as scan lines and data lines may be used in controlling the pixels to display images on the display.

Referring to FIG. 1B, the light sensor 120 is located adjacent to the display 110. For example, the light sensor 120 may be located under the display 110, from the cross section view of the electronic device 100. In some examples, the light sensor 120 can be connected to a motherboard of the electronic device 100. In some examples, the light sensor 120 can be connected to a back cover 115 of the electronic device 100.

The light sensor 120 can receive ambient light 130 through the display 110. The light sensor 120 can be, for example, an ambient light sensor (ALS) or a red-green-blue (RGB) color sensor. In some examples, the light sensor 120 can receive electromagnetic energy in a range of bands of the electromagnetic spectrum. In some examples, the electronic device 100 can include more than one light sensor 120.

An ALS sensor can measure ambient light to adapt display brightness. An ALS can detect overall light intensity surrounding the electronic device 100. Based on the detected light intensity, the display 110 can adjust brightness and contrast. Adjusting brightness and contrast can improve visibility of images on the display 110 and can improve battery life of the electronic device 100.

An RGB sensor can measure ambient color to adapt display color. An RGB sensor includes individual sensors that can detect red, green, and blue light. An RGB sensor can detect a proportion of each color in the light surrounding the electronic device 100. Based on detected color, the display 110 can adjust color balance. Adjusting color balance can improve visibility and quality of images on the display 110.

This specification describes burn-in compensation techniques primarily with reference to luminance of light emitted by pixels, as measured by an ALS sensor. However, the techniques described can also be applied to luminance of individual subpixels, e.g., RGB subpixels, as measured by an RGB sensor.

Figure 2A:
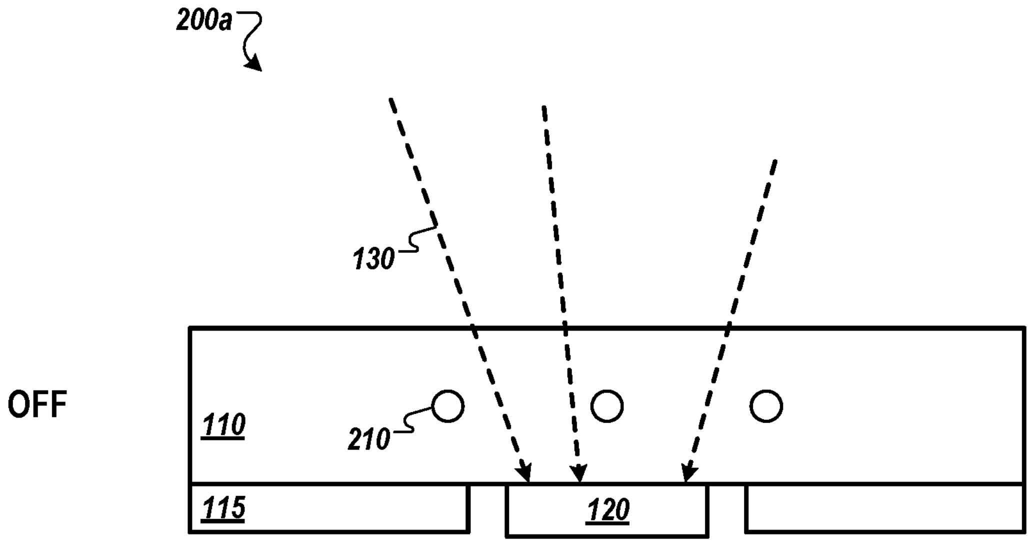
FIGS. 2A and 2B show cross section views of the example display and the light sensor in an emission-off condition and an emission-on condition, respectively.
Figure 2B:
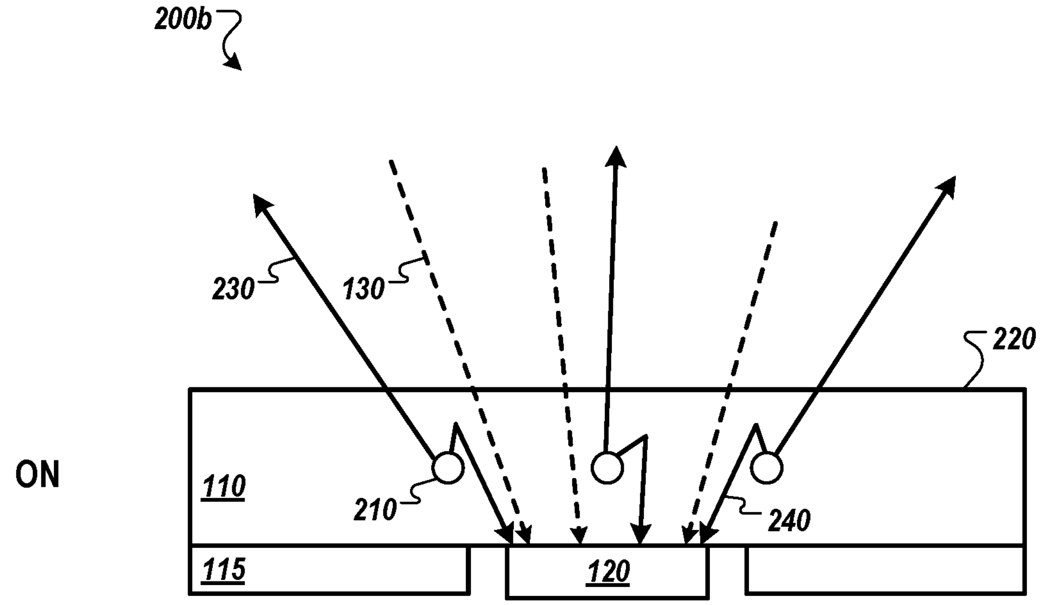

FIGS. 2A and 2B show cross section views 200*a*, 200*b* of the example display 110 and the light sensor 120 in an emission-off ("OFF") condition and an emission-on ("ON") condition, respectively. In both the OFF condition and the ON condition, the sensor 120 receives ambient light 130 through adjacent pixels 210 of the display 110.

FIG. 2A shows a cross section view of the example display 110 and the light sensor 120 in the OFF condition. In the OFF condition, the adjacent pixels 210 emit no light. Thus, the sensor 120 receives only the ambient light 130.

FIG. 2B shows a cross section view of the example display 110 and the light sensor 120 in the ON condition. In the ON condition, the adjacent pixels 210 emit light.

Some of the light emitted from each of the pixels 210 is projected light 230. The projected light 230 projects outward from a surface 220 of the display 110, such that an image is shown on the display 110.

Some of the light emitted from each of the pixels 210 is reflected light 240. The reflected light 240 reflects away from the surface 220 of the display 110. The reflected light 240 can reflect off of one or more internal layers of the display 110. Some of the reflected light 240 may be received by the sensor 120. Thus, in the ON condition, the sensor 120 receives both ambient light 130 and reflected light 240. The reflected light 240 from the adjacent pixels 210 is a fraction of the total light emitted from the adjacent pixels 210. The intensity, or luminance, of the reflected light 240 may be indicative of the intensity of light emitted from the pixel 210. For example, the luminance of the reflected light 240 may be proportional to the luminance of light emitted from the pixels 210.

The sensor 120 can receive and measure a luminance of received light while in the OFF condition, and while in the ON condition. The difference between received luminance while in the OFF condition and the ON condition is the luminance of the reflected light, and therefore indicates the luminance of light emitted from the pixels 210. The luminance of light emitted from the pixels 210, and therefore the luminance of reflected light, may change over time due to degradation, or burn-in. The luminance of light emitted from the pixels 210, and therefore the luminance of reflected light, may also change over time due overcompensation or undercompensation by a burn-in model.

Figure 3:
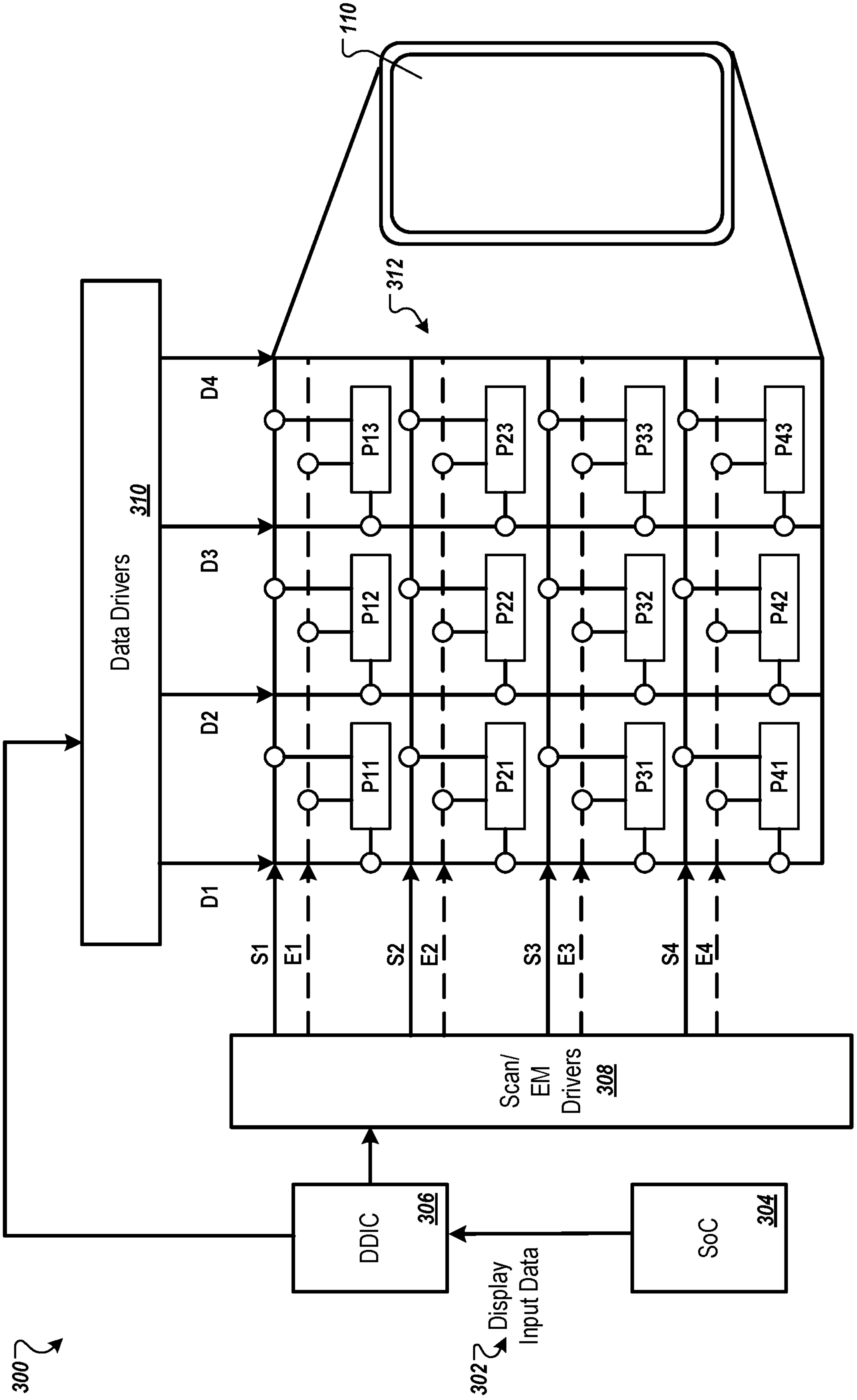
FIG. 3 is a diagram of a display system of the example electronic display.

FIG. 3 is a diagram of a display system 300 of the electronic display 110. The display system 300 is an OLED display system that includes an array 312 of light-emitting pixels. Each light-emitting pixel includes an OLED. The OLED display is driven by drivers including scan/emission drivers 308 and data drivers 310. In general, the scan/emission drivers 308 selects a row of pixels in the display, and the data drivers 310 provide data signals (e.g. voltage data) to the pixels in the selected row to light the selected OLEDs according to the image data. Signal lines such as scan lines, emission lines, and data lines may be used in controlling the pixels to display images on the display. FIG. 3 illustrates the display system having the scan/emission drivers on one side of the system but the drivers can be placed on both left and right sides of the display improving the driving performance (e.g. speed).

The display system 300 includes the pixel array 312 that includes a plurality of light-emitting pixels, e.g., the pixels P11 through P43, A pixel is a small element on a display that can change color based on the image data supplied to the pixel. Each pixel within the pixel array 312 can be addressed separately to produce various intensities of color. The pixel array 312 extends in a plane and includes rows and columns. A row extends horizontally across the array. For example, the first row of the pixel array 312 includes pixels P11, P12, and PH. A column extends vertically down the display. For example, the first column of the pixel array 312 includes pixels P11, P21, P31, and P41. Only a few pixels are shown in FIG. 3 for simplicity. In practice, there may be several million pixels in the pixel array 312. Greater numbers of pixels can result in higher image resolution.

The display system 300 includes scan/emission drivers 308 and data drivers 310. The scan/emission drivers 308 are integrated, i.e., stacked, row line drivers that supply signals to rows of the pixel array 312. For example, the scan/emission drivers 308 supply scan signals S1 to S4, and emission signals E1 to E4, to the rows of pixels. The data drivers 310 supply signals to columns of the pixel array 312. For example, the data drivers 310 supply data signals D1 to D4 to the columns of pixels.

Each pixel in the pixel array 312 is addressable by a horizontal scan line and emission line, and a vertical data line. For example, the pixel P11 is addressable by the scan line S1, the emission line E1, and the data line D1. In another example, the pixel P32 is addressable by the scan line S3, the emission line E3, and the data line D2.

The display system 300 includes a display driver integrated circuit (DDIC) 306 that receives display input data 302 from a system-on-chip (SoC) 304. The DDIC 306 may include a graphic controller and a timing controller. The DDIC 306 generates the timing of the signals for delivery to the display. The DDIC 306 provides the input signals (e.g. clock signals, start pulses) to the scan/emission drivers 308, and the image data to the data drivers 310.

The scan/emission drivers 308 and the data drivers 310 provide signals to the pixels enabling the pixels reproduce the image on the display screen. The scan/emission drivers 308 and the data drivers 310 provide the signals to the pixels via the scan lines, the emission lines, and the data lines. To provide the signals to the pixels, the scan/emission drivers 308 select a scan line and control the emission operation of the pixels. The data drivers 310 provides data signals to the pixels addressable by the selected scan line to light the selected OLEDs according to the image data.

Although FIG. 3 illustrates an OLED display, the technique for burn-in compensation may be applied to any flat panel display that includes an array of pixels. For example, the technique for burn-in compensation may be applied to light-emitting diode (LED) liquid crystal displays (LCD) and plasma electronic displays (PDP).

Figure 4:
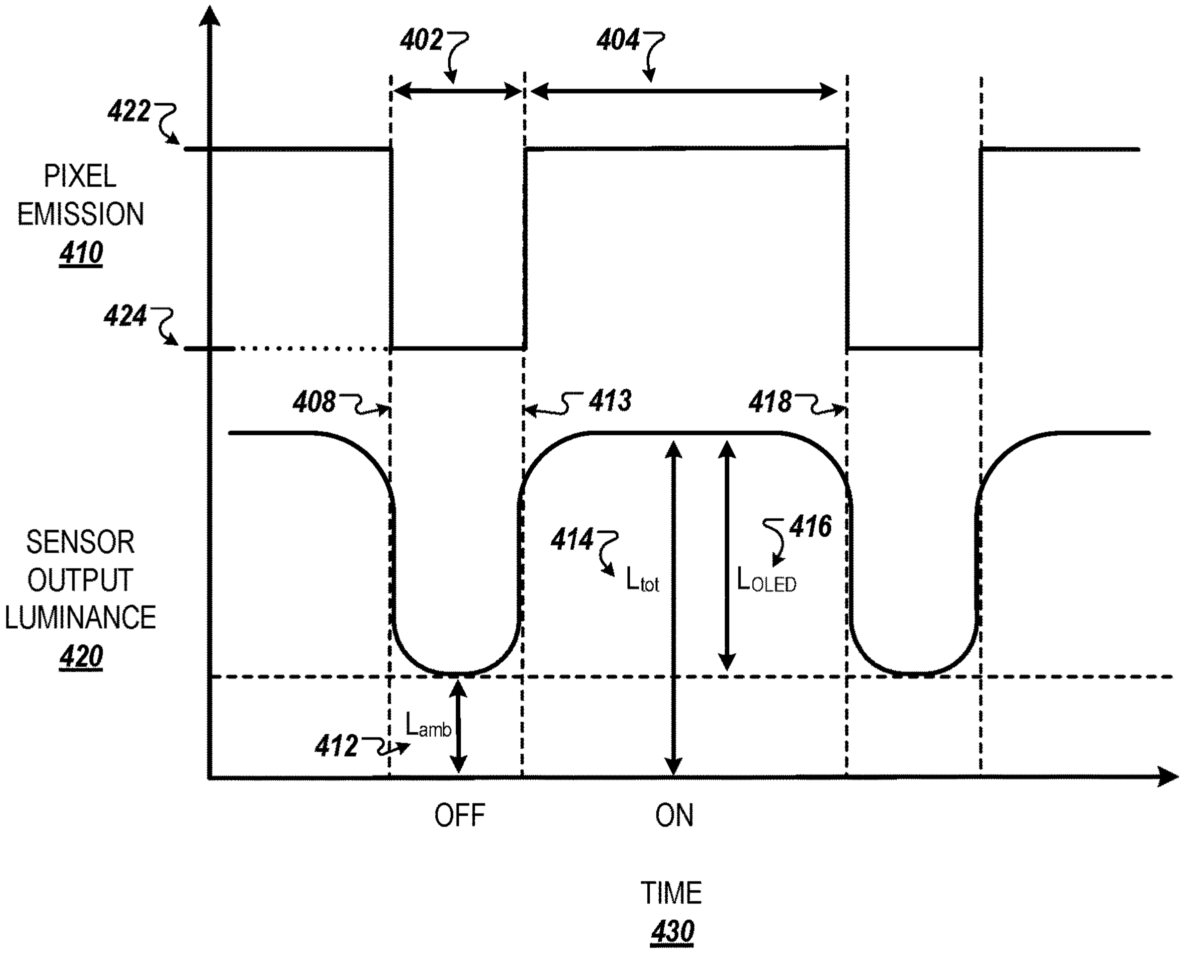
FIG. 4 is an example operating timing diagram for the example display with the light sensor.

FIG. 4 is an example operating timing diagram for the example display 110 with the light sensor 120. FIG. 4 shows a graph of pixel emission 410, and a graph of sensor output luminance 420, over time 430.

The pixel emission 410 can represent operation, e.g., a driving voltage, of one of the pixels 210 that is adjacent to the sensor 120. The pixel emission 410 can also represent operation of a row of multiple pixels 210 that are adjacent to the sensor 120. The pixel emission 410 shows the pixel alternating between a high value 422 and a low value 424.

At time 408, the pixel turns off for a duration of an emission-off period 402, illustrated by the pixel emission 410 dropping from the high value 422 to the low value 424. During the emission-off period 402, the pixel emits no light. At time 413, the pixel turns on for a duration of an emission-on period 404, illustrated by the pixel emission 410 rising to the high value 422. During the emission-on period 404, the pixel emits light. At time 418, the pixel turns off again.

The pixel may turn on an off at designated intervals, e.g., corresponding to a frame rate of the display system. During the emission-off period, the display system may program the pixel with image data for a next frame.

The sensor output luminance 420 can represent output of the sensor 120. The sensor 120 can measure and output luminance (L) of received light over time 430. During the emission-off period 402, the sensor 120 only receives ambient light. The sensor 120 therefore measures ambient luminance ($L_{amb}$) 412 of received light during the emission-off period 402.

During the emission-on period 404, the sensor 120 receives both ambient light and light internally reflected from the adjacent pixels of the display. Reflected OLED luminance $L_{OLED}$ 416 is a luminance of light internally reflected from the adjacent pixels and received by the sensor 120 during the emission-on period 404.

The sensor 120 measures a total luminance $L_{tot}$ 414 of received light during the emission-on period 404 that is a combination of ambient luminance $L_{amb}$ 412 and reflected OLED luminance $L_{OLED}$ 416. By subtracting the ambient luminance $L_{amb}$ 412 from the total luminance $L_{tot}$ 414, a display system can calculate the reflected OLED luminance $L_{OLED}$ 416. The reflected OLED luminance $L_{OLED}$ 416 may be a function of pixel intensity, e.g., may be proportional to pixel luminance. Thus, based on the reflected OLED luminance $L_{OLED}$ 416, the display system can estimate pixel luminance.

Figure 5:
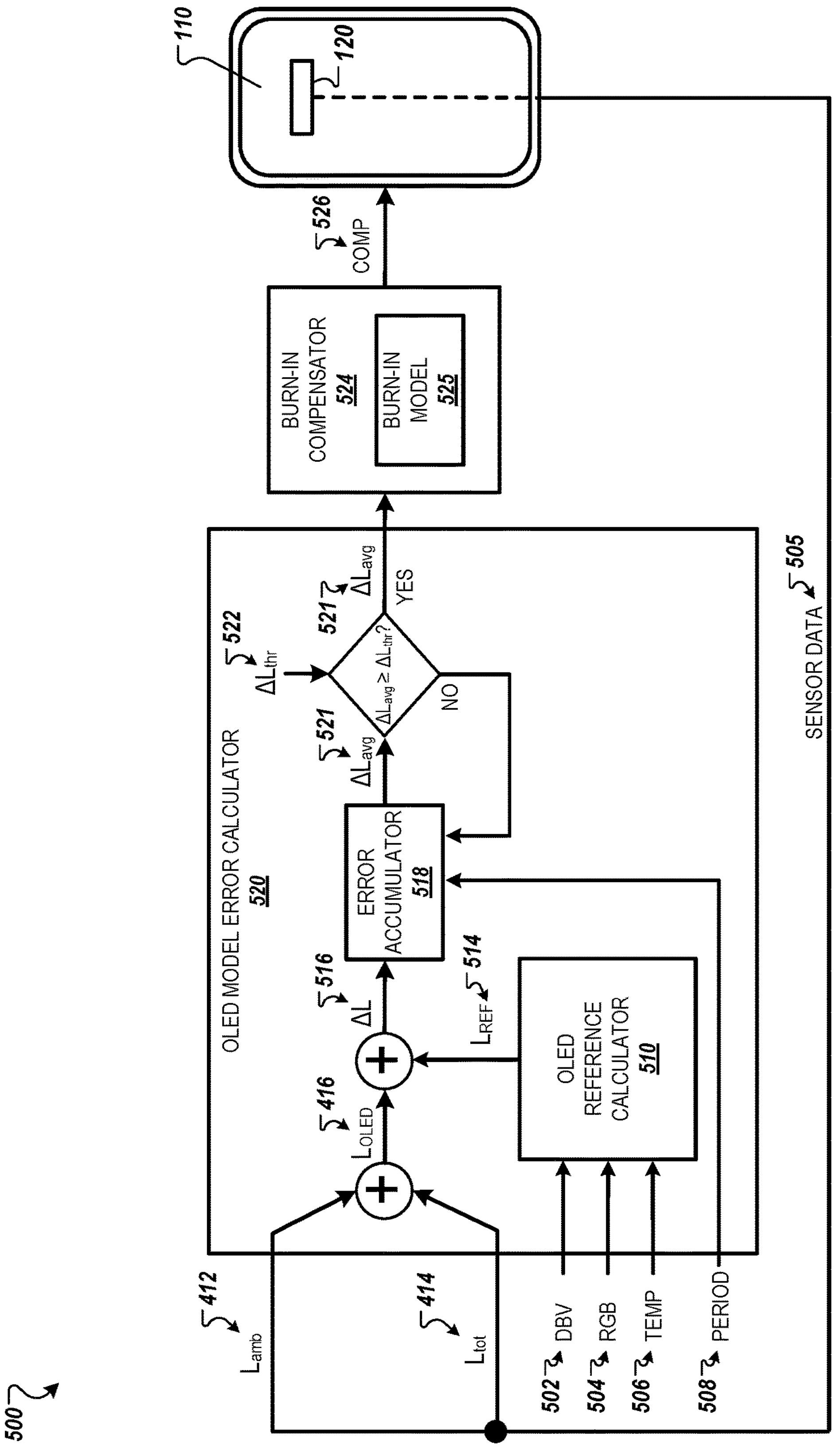
FIG. 5 is a diagram of an example system for display burn-in compensation.

FIG. 5 is a diagram of an example system 500 for display burn-in compensation. The system 500 compensates an image to be shown on a display, e.g., the display 110. The system 500 includes the display 110 with the sensor 120, an OLED model error calculator (OMEC) 520, and a burn-in compensator 524. The OMEC 520 includes an OLED reference calculator 510 and an error accumulator 518. The burn-in compensator 524 includes a burn-in model 525. In some examples, the OMEC 520, the burn-in compensator 524, or both, can be components of the DDIC or the SoC, e.g., the DDIC 306 or the SoC 304 of the display system 200.

The burn-in model 525 is a model of expected degradation over time for the pixels of the display 110. The burn-in model 525 can include expected average pixel and/or sub-pixel luminance as a function of time, e.g., time of operation. In general, pixel luminance is expected to decrease over time. The burn-in model 525 can be pre-programmed and may be based on historical trends and statistical data.

The burn-in compensator 524 can compensate the display 110 according to the burn-in model 525. For example, at a certain time of operation, the burn-in model 525 may predict that pixels of the display 110 will be 3% dimmer, on average, than the initial programmed luminance level. The burn-in compensator 524 can therefore provide a compensating signal COMP 526 to the display 110 to increase the luminance of the pixels by 3%. The compensating signal COMP 526 may include, for example, an adjustment to the driving voltage provided by the DDIC 306. The adjusted driving voltage causes the average pixel luminance to rise 3%, returning to the initial programmed luminance level.

In operation, pixel degradation might not follow the burn-in model 525 exactly. For example, the burn-in model 525 may be based on an expected usage time, expected environmental conditions, e.g., temperature, and other factors. Actual conditions of usage may differ from the expected conditions. Thus, actual pixel luminance at a certain time may be more or less than predicted by the burn-in model 525. The difference between predicted pixel luminance and actual pixel luminance can be considered luminance error.

Due to luminance error, the burn-in compensator 524 may overcompensate or undercompensate the display 110. If the burn-in rate is less than predicted by the burn-in model 525, the burn-in compensator 524 will likely overcompensate the display 110. This can result in actual pixel luminance exceeding the programmed pixel luminance. If the burn-in rate is greater than predicted by the burn-in model 525, the burn-in compensator 524 will likely undercompensate the display 110. This can result in actual pixel luminance being less than the programmed luminance.

The system 500 can mitigate undercompensation and overcompensation of burn-in. The system 500 can measure errors between expected pixel luminance and actual pixel luminance, and can apply a correction to the burn-in model 525.

In order to measure and mitigate undercompensation and overcompensation of burn-in, the OLED reference calculator 510 can calculate a reference luminance $L_{REF}$ 514. The reference luminance $L_{REF}$ 514 can be an expected reflected OLED luminance, e.g., a luminance level of reflected light that the sensor 120 is expected to receive at a given time. Since the reflected light from each pixel is a fraction of the total light emitted from the pixel, the reference luminance $L_{REF}$ 514 is a luminance value that is less than the expected pixel luminance.

The OLED reference calculator 510 can be calibrated to the particular display 110. For example, upon assembly, the pixels may emit light at a known, programmed, luminance, given certain display brightness values (DBVs) 502, RGB values 504, and environmental conditions, e.g., ambient temperature (TEMP) 506. The sensor 120 can measure the total luminance $L_{tot}$ 414 and the ambient luminance $L_{amb}$ 412. The OMEC 520 can collect, from the sensor 120, data indicating the total luminance $L_{tot}$ 414 and the ambient luminance $L_{amb}$ 412. The OMEC 520 can compare the total luminance $L_{tot}$ 414 to the ambient luminance $L_{amb}$ 412 to calculate the reflected luminance for the known conditions. The OLED reference calculator 510 can then be calibrated to correlate the calculated reflected luminance with the known emitted luminance.

Once calibrated, the OLED reference calculator 510 can calculate the reference luminance $L_{REF}$ 514 based on a number of factors. For example, the OLED reference calculator 510 can calculate the reference luminance $L_{REF}$ 514 based on programmed DBV 502, RGB values 504, and ambient temperature 506.

During operation, the sensor 120 collects sensor data 505. The sensor data 505 can include luminance of received light over time, as shown in FIG. 4. The sensor data 505 can also include the total luminance $L_{tot}$ 414, measured during emission-on periods, and the ambient luminance $L_{amb}$ 412, measured during emission-off periods.

The OMEC 520 can compare the total luminance $L_{tot}$ 414 to the ambient luminance $L_{amb}$ 412 to calculate the reflected OLED luminance $L_{OLED}$ 416. The OMEC 520 can then compare the reflected OLED luminance $L_{OLED}$ 416 to the reference luminance $L_{REF}$ 514, e.g., by subtracting $L_{REF}$ 514 from $L_{OLED}$ 416, to calculate reflected luminance error $\Delta L$ 516.

The reflected luminance error $\Delta L$ 516 represents a difference between the luminance of light internally reflected from the adjacent pixels and received by the sensor during the emission-on period, and the reference luminance $L_{REF}$ 514. The reflected luminance error $\Delta L$ 516 can be a positive value or a negative value. A positive $\Delta L$ 516 can indicate overcompensation, while a negative $\Delta L$ 516 can indicate undercompensation.

The error accumulator 518 can accumulate and average the reflected luminance error $\Delta L$ 516 over a time period 508. The time period 508 can be, for example, a number of hours, days, weeks, or months. The error accumulator 518 outputs an average error $\Delta L_{avg}$.

The OMEC 520 can compare the average error $\Delta L_{avg}$ to a luminance threshold error $\Delta L_{thr}$. The luminance threshold error $\Delta L_{thr}$ can be, for example, an error value that may cause visible display effects, e.g., +/−5% of the programmed luminance.

The OMEC 520 may determine that the average error $\Delta L_{avg}$ between the luminance of light internally reflected from the adjacent pixels and the reference luminance exceeds the threshold error $\Delta L_{thr}$. If the average error $\Delta L_{avg}$ equals or exceeds the luminance threshold error $\Delta L_{thr}$, the OMEC 520 can output the average error $\Delta L_{avg}$ to the burn-in compensator 524.

The burn-in compensator 524 updates the burn-in model 525 based on the average error $\Delta L_{avg}$. In some examples, the burn-in compensator 524 can update the burn-in model 525 by offsetting the burn-in model 525 by a correction factor. The correction factor may be, for example, an additive inverse of the average error $\Delta L_{avg}$. For example, the average error $\Delta L_{avg}$ may be +5.1%. The burn-in compensator 524 may update the burn-in model 525 by offsetting the burn-in model 525 by −5.1%, to return the pixel luminance to the programmed value.

In some examples, the burn-in compensator 524 may update the burn-in model 525 for all of the pixels of the display 110. For example, in smaller displays, the display system may assume that burn-in rates for all of the pixels of the array are approximately equal. Thus, though the sensor 120 might only be adjacent to a fraction of pixels of the array, the burn-in model update can be applied to all of the pixels of the display.

In some examples, the burn-in compensator 524 may update the burn-in model 525 for a selection of the pixels of the display 110. For example, some displays may have more than one sensor, e.g., a first sensor adjacent to a top region of the display and a second sensor adjacent to a bottom region of a display. Thus, the burn-in compensator 524 may update the burn-in model 525 for pixels of the display that are nearer to the first sensor with model updates calculated using sensor data 505 from the first sensor. The burn-in compensator 524 may update the burn-in model 525 for pixels of the display that are nearer to the second sensor with model updates calculated using sensor data 505 from the second sensor.

In some examples, the OMEC 520 may continuously calculate luminance error. In some examples, the OMEC 520 may calculate luminance error at designated time intervals or in response to an event. For example, the OMEC may calculate luminance error at an interval of once per hour, once per day, or once per week. In some examples, the OMEC may calculate luminance error in response to the display turning on, or in response to receiving input from a user.

The burn-in compensator 524 sends the compensation signal COMP 526 to the display 110. The compensation signal COMP 526 includes an adjusted driving voltage based on the burn-in model, including the applied correction factor based on luminance error. Adjusting the driving voltage by the correction factor can reduce the error to zero, or near zero.

Figure 6:
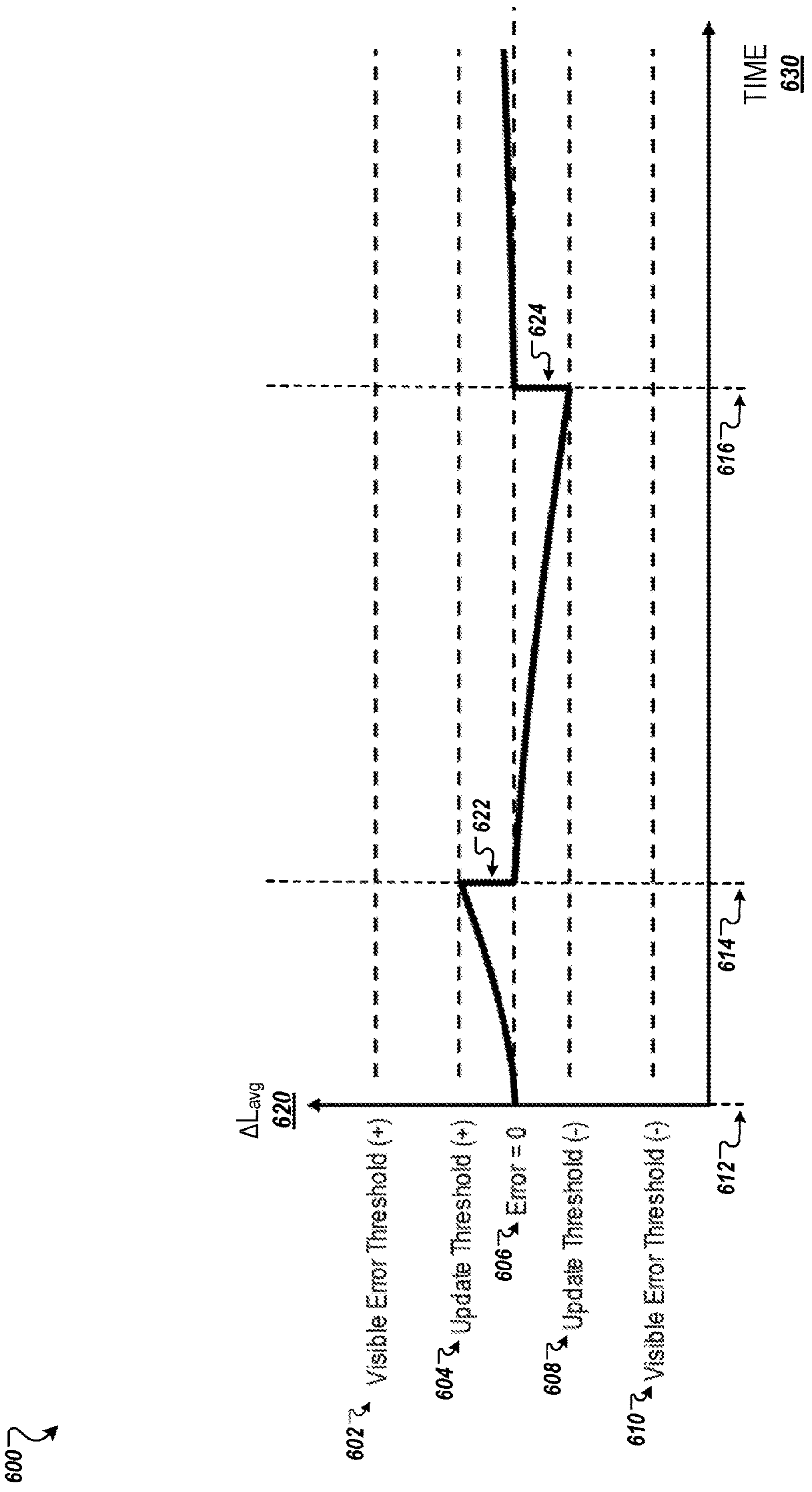
FIG. 6 is an example graph of luminance error over time for the display with burn-in compensation.

FIG. 6 is an example graph 600 of luminance error over time for the display 110 with burn-in compensation. Specifically, FIG. 6 shows a graph of average error $\Delta L_{avg}$ 620 over time 630. The burn-in compensator 524 maintains the average error $\Delta L_{avg}$ 620 between a positive update threshold 604 and a negative update threshold 608. The positive update threshold 604 and/or the negative update threshold 608 may be, for example, the luminance threshold error $\Delta L_{thr}$ of FIG. 5. The burn-in compensator 524 prevents the average error $\Delta L_{avg}$ 620 from reaching either a positive visible threshold error 602 or a negative visible threshold error 610.

In some examples, the positive update threshold 604, the negative update threshold 608, the positive visible threshold error 602, and the negative visible threshold error 610 can each be a percentage error of the programmed luminance. For example, the positive update threshold 604 and the negative update threshold 608 may be +1.0% and −1.0%, respectively. The positive visible threshold error 602 and the negative visible threshold error 610 may be +5.0% and −5.0%, respectively.

At time 612, the average error $\Delta L_{avg}$ 620 is at a value of zero error 606. At zero error 606, the reflected OLED luminance $L_{OLED}$ 416 is equal to the reference luminance $L_{REF}$ 514, on average. The display operates for a period of time 630. The time 630 may be, for example, multiple weeks or months of operation. Between time 612 and time 614, the average error $\Delta L_{avg}$ 620 increases. The average error $\Delta L_{avg}$ 620 may increase, for example, due to overcompensation of burn-in.

At time 614, the average error $\Delta L_{avg}$ 620 reaches the positive update threshold 604. When the average error $\Delta L_{avg}$ 620 reaches the positive update threshold 604, the OMEC 520 outputs the average error $\Delta L_{avg}$ 620 to the burn-in compensator 524. The burn-in compensator 524 updates the burn-in model 525 based on the average error $\Delta L_{avg}$ 620, e.g., by offsetting the burn-in model by a correction factor of $(-\Delta L_{avg})$. When the burn-in compensator 524 updates the burn-in model 525, the average error $\Delta L_{avg}$ 620 drops 622 to zero error 606.

Just after time 614, the average error $\Delta L_{avg}$ 620 is at a value of zero error 606. At zero error 606, the reflected OLED luminance $L_{OLED}$ 416 is equal to the reference luminance $L_{REF}$ 514, on average. Between time 614 and time 616, the average error $\Delta L_{avg}$ 620 decreases. The average error $\Delta L_{avg}$ 620 may decrease, for example, due to undercompensation of burn-in.

At time 616, the average error $\Delta L_{avg}$ 620 reaches the negative update threshold 608. When the average error $\Delta L_{avg}$ 620 reaches the negative update threshold 608, the OMEC 520 outputs the average error $\Delta L_{avg}$ 620 to the burn-in compensator 524. The burn-in compensator 524 updates the burn-in model 525 based on the average error $\Delta L_{avg}$ 620, e.g., by offsetting the burn-in model by the correction factor of $(-\Delta L_{avg})$. In this example, $\Delta L_{avg}$ has a negative error value, and $(-\Delta L_{avg})$ has a positive value that is the additive inverse of $\Delta L_{avg}$. When the burn-in compensator 524 updates the burn-in model 525, the average error $\Delta L_{avg}$ 620 rises 624 to zero error 606.

The process for burn-in compensation can be used throughout display operation to maintain consistent pixel brightness and color in displays. The system 500 can continue to measure luminance error and to update the burn-in model when luminance error reaches designated thresholds. The techniques described can improve display quality and can increase OLED lifetime.

Embodiments of the subject matter and the functional operations described in this specification can be implemented in any suitable electronic device such as a personal computer, a mobile telephone, a smart phone, a smart watch, a smart TV, a mobile audio or video player, a game console, or a combination of one or more of these devices.

The electronic device may include various components such as a memory, a processor, a display, and input/output units. The input/output units may include, for example, a transceiver which can communicate with the one or more networks to send and receive data. The display may be any suitable display including, for example, a cathode ray tube (CRT), liquid crystal display (LCD), or light-emitting diode (LED) display, for displaying images.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for driving a display, a sensor being arranged behind the display to receive light transmitted by light-emitting pixels of the display; the method comprising:

driving the display with driving voltage signals that are compensated according to a burn-in model that represents predicted pixel degradation over time;

determining a luminance of light received by the sensor during an emission-on period during which a subset of the light-emitting pixels in front of the sensor emit light, wherein during the emission-on period, the subset of the light emitting pixels in front of the sensor emit light according to programmed display brightness values;

determining a luminance of light received by the sensor during an emission-off period during which the subset of the light-emitting pixels in front of the sensor emit no light;

calculating, by comparing the luminance of the light received by the sensor during the emission-on period to the luminance of the light received by the sensor during the emission-off period, a luminance of light internally reflected from the subset of the light-emitting pixels and received by the sensor during the emission-on period;

calculating, using the programmed display brightness values, a reference luminance comprising an expected luminance of light internally reflected from the subset of the light-emitting pixels and received by the sensor when the subset of the light-emitting pixels emit light according to the programmed display brightness values;

determining that a difference between the luminance of light internally reflected from the subset of the light-emitting pixels and the reference luminance equals or exceeds a threshold difference;

in response to determining that the difference between the luminance of light internally reflected from the subset of the light-emitting pixels and the reference luminance equals or exceeds a threshold difference, adjusting the burn-in model by a correction factor to obtain an adjusted burn-in model; and driving the display with adjusted driving voltage signals that are compensated according to the adjusted burn-in model.

2. The method of claim 1, wherein the display comprises an array of organic light-emitting diodes (OLEDs).

3. The method of claim 1, wherein the correction factor comprises an additive inverse of the difference between the luminance of light internally reflected from the subset of the light-emitting pixels and the reference luminance.

4. The method of claim 1, wherein the sensor is one of an ambient light sensor or a red-green-blue (RGB) sensor.

5. The method of claim 1, wherein determining that the difference between the luminance of light internally reflected from the subset of the light-emitting pixels and the reference luminance equals or exceeds the threshold difference comprises:
accumulating the difference over a period of time;
averaging the difference; and
comparing the averaged difference to the threshold difference.

6. The method of claim 1, wherein the burn-in model represents predicted pixel degradation over time for all light-emitting pixels of the display.

7. The method of claim 1, wherein the burn-in model represents predicted pixel degradation over time for a selection of fewer than all of the light-emitting pixels of the display.

8. A display system, comprising:
a display including light-emitting pixels;
a sensor arranged behind the display to receive light transmitted by the light-emitting pixels of the display; and
a controller module in electrical communication with the display, the controller module being programmed to:
drive the display with driving voltage signals that are compensated according to a burn-in model that represents predicted pixel degradation over time;
determine a luminance of light received by the sensor during an emission-on period during which a subset of the light-emitting pixels in front of the sensor emit light, wherein during the emission-on period, the subset of the light emitting pixels in front of the sensor emit light according to programmed display brightness values;
determine a luminance of light received by the sensor during an emission-off period during which the subset of the light-emitting pixels in front of the sensor emit no light;
calculate, by comparing the luminance of the light received by the sensor during the emission-on period to the luminance of the light received by the sensor during the emission-off period, a luminance of light internally reflected from the subset of the light-emitting pixels and received by the sensor during the emission-on period;
calculate, using the programmed display brightness values, a reference luminance comprising an expected luminance of light internally reflected from the subset of the light-emitting pixels and received by the sensor when the subset of the light-emitting pixels emit light according to the programmed display brightness values;
determine that a difference between the luminance of light internally reflected from the subset of the light-emitting pixels and a reference luminance equals or exceeds a threshold difference;
in response to determining that the difference between the luminance of light internally reflected from the subset of the light-emitting pixels and the reference luminance equals or exceeds a threshold difference, adjust the burn-in model by a correction factor to obtain an adjusted burn-in model; and
driving the display with adjusted driving voltage signals that are compensated according to the adjusted burn-in model.

9. The display system of claim 8, wherein the display comprises an array of organic light-emitting diodes (OLEDs).

10. The display system of claim 8, wherein the sensor is one of an ambient light sensor or a red-green-blue (RGB) sensor.

11. The display system of claim 8, wherein determining that the difference between the luminance of light internally reflected from the subset of the light-emitting pixels and the reference luminance equals or exceeds the threshold difference comprises:
accumulating the difference over a period of time;
averaging the difference; and
comparing the averaged difference to the threshold difference.

12. The display system of claim 8, wherein the burn-in model represents predicted pixel degradation over time for all light-emitting pixels of the display.

13. The display system of claim 8, wherein the burn-in model represents predicted pixel degradation over time for a selection of fewer than all of the light-emitting pixels of the display.

14. A non-transitory computer-readable medium containing instructions which when executed on a data processing apparatus in communication with a display drives the display, the display comprising light-emitting pixels, a sensor being arranged behind the display to receive light transmitted by the light-emitting pixels of the display, wherein execution of the instructions by the data processing apparatus causes performance of operations comprising:
driving the display with driving voltage signals that are compensated according to a burn-in model that represents predicted pixel degradation over time;
determining a luminance of light received by the sensor during an emission-on period during which a subset of the light-emitting pixels in front of the sensor emit light, wherein during the emission-on period, the subset of the light emitting pixels in front of the sensor emit light according to programmed display brightness values;
determining a luminance of light received by the sensor during an emission-off period during which the subset of the light-emitting pixels in front of the sensor emit no light;
calculating, by comparing the luminance of the light received by the sensor during the emission-on period to the luminance of the light received by the sensor during the emission-off period, a luminance of light internally reflected from the subset of the light-emitting pixels and received by the sensor during the emission-on period;
calculating, using the programmed display brightness values, a reference luminance comprising an expected luminance of light internally reflected from the subset of the light-emitting pixels and received by the sensor when the subset of the light-emitting pixels emit light according to the programmed display brightness values;
determining that a difference between the luminance of light internally reflected from the subset of the light-emitting pixels and a reference luminance equals or exceeds a threshold difference;
in response to determining that the difference between the luminance of light internally reflected from the subset of the light-emitting pixels and the reference luminance equals or exceeds a threshold difference, adjust the burn-in model by a correction factor to obtain an adjusted burn-in model; and driving the display with adjusted driving voltage signals that are compensated according to the adjusted burn-in model.

15. The method of claim 1, wherein, during the emission-on period, the subset of the light emitting pixels in front of the sensor emit light according to programmed color values, the method comprising calculating the reference luminance based at least in part on the programmed color values.

* * * * *